United States Patent
Bourghelle et al.

[11] Patent Number: 5,905,835
[45] Date of Patent: May 18, 1999

[54] OPTICAL FIBER MULTI-RIBBON

[75] Inventors: Patrick Bourghelle, Saint Denis, France; Christopher Mc Nutt, Hickory, N.C.; David Benzel, Neuilly sur Seine, France

[73] Assignee: Alcatel Cable France, Clichy, France

[21] Appl. No.: 08/903,765

[22] Filed: Jul. 31, 1997

[30] Foreign Application Priority Data

Aug. 1, 1996 [FR] France ................... 94 09724

[51] Int. Cl.⁶ ................................. G02B 6/44
[52] U.S. Cl. ................. 385/114; 385/100; 385/127; 385/128; 385/141
[58] Field of Search ............. 385/100–114, 127, 385/128, 141, 147

[56] References Cited

U.S. PATENT DOCUMENTS 5,524,164  6/1996  Hattori et al. .................... 385/114

FOREIGN PATENT DOCUMENTS

0636913A1  2/1995  European Pat. Off. ........... 385/114

OTHER PUBLICATIONS

Patent Abstracts of Japan, vol. 014, No. 035 (P–994), Jan. 23, 1990 corresponding to JP 01 271715 A (Fujikura Ltd) dated Oct. 30, 1989.

Patent Abstracts of Japan, vol. 017, No. 684 (P–1661) Dec. 15, 1993 corresponding to JP 05 232361 A (Furukawa Electric Co Ltd) dated Sep. 10, 1993.

*Primary Examiner*—Phan Palmer
*Attorney, Agent, or Firm*—Sughrue, Mion, Zinn, Macpeak & Seas, PLLC

[57] ABSTRACT

An optical fiber multi-ribbon including at least two initial optical fiber ribbons having individual first sheaths for assembling the fibers of each ribbon together side by side and in a common plane. The initial optical fiber ribbons are disposed side by side and in a common plane and a common exterior second sheath surrounds the initial ribbons. The individual first sheaths of the initial ribbons and the common exterior second sheath are made from the same resin. This resin is advantageously relatively hard. Applications include high-density optical telecommunication cables.

4 Claims, 1 Drawing Sheet

OPTICAL FIBER MULTI-RIBBON

BACKGROUND OF THE INVENTION

1. Field of the Invention

The present invention concerns optical fiber ribbons. It is more particularly concerned with an optical fiber multi-ribbon in which the optical fibers are those of at least two initially independent ribbons disposed side by side in a common plane and assembled together in a common exterior sheath surrounding them.

2. Description of the Prior Art

Accordingly, a multi-ribbon of this kind can advantageously include a large number of optical fibers to be used to fabricate a high-density optical cable, for example a telecommunication cable.

Document EP-A-0 636 913 discloses an optical fiber ribbon in which the fibers are disposed and assembled together side by side. In particular, this ribbon includes at least two independent initial ribbons and a common exterior sheath around the initial ribbons. The various fibers of each initial ribbon, which have an individual protective coating, are disposed side by side and surrounded by a common assembly sheath.

The exterior protective coating of each fiber is of a conventional, relatively hard resin selected from thermosetting resins and resins that can be cross-linked, for example by ultraviolet light. This resin is used as the main constituent of the sheath assembling the fibers of each of the initial ribbons and the common exterior sheath surrounding the various initial ribbons.

In particular, the common exterior sheath around the initial ribbons includes this main constituent of relatively hard resin and a component which is not very compatible with the main constituent. In a preferred embodiment, a reactive functional group is introduced into this component and thereby incorporated into the resin forming the main constituent when the latter is cross-linked. In another preferred embodiment the component of low compatibility which is cross-linked on its own has a lower Young's modulus than the main constituent and forms a discontinuous phase of five microns or less after the resin is cross-linked. The addition of a low compatibility component of this kind into the resin constituent decreases the coefficient of friction of the resultant resin into which it has been incorporated.

These embodiments are relatively complex. Further, the absence of sufficient friction between the common exterior sheath and the sheaths of the initial ribbons means that the geometrical retention of the ribbons is not always satisfactory for mass splicing by fusing the fibers of these initial ribbons or of this multi-ribbon to those of other similar initial ribbons or another similar multi-ribbon. Furthermore, it is not easy to separate the multi-ribbon into its initial ribbons. This separation exploits the fact that the exterior resin including the low compatibility component is in fact peelable.

An aim of the present invention is to solve these problems for easy manufacture of a multi-ribbon that is easily cut to separate the initial ribbons.

SUMMARY OF THE INVENTION

The present invention consists in an optical fiber multi-ribbon including at least two initial optical fiber ribbons having individual first sheaths for assembling the fibers of each ribbon together side by side and in a common plane and themselves disposed side by side and in a common plane and a common exterior second sheath surrounding said initial ribbons, wherein said individual first sheaths of said initial ribbons and said common exterior second sheath are made from the same resin.

The sheaths are advantageously made of a relatively hard resin.

This multi-ribbon includes a transverse preferential rupture line passing through each point of contact between two consecutive initial ribbons.

The features and advantages of the present invention will emerge from the following description of one embodiment shown in the accompanying drawing.

DETAILED DESCRIPTION OF THE PREFERRED EMBODIMENT

Figure 1:
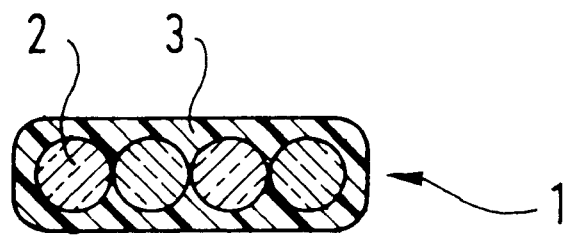
FIG. 1 shows an optical fiber ribbon of a type that is known in itself.

In FIG. 1, the optical fiber ribbon 1 includes four optical fibers 2 disposed side by side in a common plane and held thus by an assembly sheath 3. The sheath 3 is of a conventional polymerizable resin having a relatively high Young's modulus so that it is relatively hard after treatment. Of course, the fibers initially have conventional individual protection layers, of single or double thickness, not shown.

Figure 2:
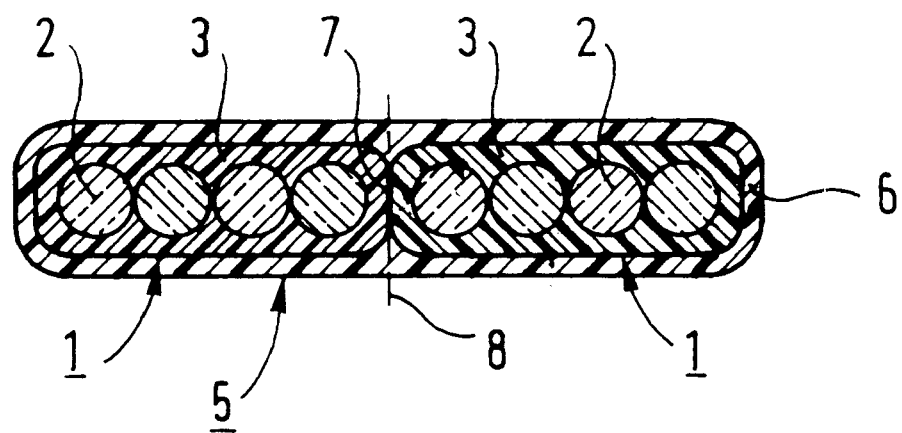
FIG. 2 shows an optical fiber multi-ribbon in accordance with the invention.

In FIG. 2, the multi-ribbon 5 of the invention includes two initial ribbons 1 which are disposed side by side in a common plane and held thus by a common exterior sheath 6. These two initial ribbons form two subassemblies in the multi-ribbon. The common exterior sheath 6 is made from the same resin as the sheaths 3 of the two initial ribbons 1 and is therefore relatively hard after treatment.

In this multi-ribbon, the common exterior sheath 6 formed over the sheaths 3 adheres well to the latter. On the other hand the interior point 7 of contact between the sheaths 3 of the two initial ribbons 1 creates on each side a preferential rupture line 8 transverse to the multi-ribbon.

This rupture line 8 enables easy and rapid separation of the initial ribbons 1, which can be done by hand.

The sheath 6 holds the two ribbons side by side and in the same plane perfectly. The geometrical characteristics of the initial ribbons are perfectly reserved in the multi-ribbon 5 and are also preserved after they are separated, for splicing the fibers to those of other ribbons identical to the ribbons 1. This multi-ribbon using a single resin for sheathing the initial ribbons and for sheathing the multi-ribbon simplifies the production lines for the initial ribbons and the multi-ribbon and reduces manufacturing time and the overall consumption of resin, the latter being of the same kind rather than of two different kinds for the multi-ribbon and for the initial ribbons.

The initial ribbons 1 can of course include the required number of fibers, generally 2, 4, 6 or 12 fibers. Likewise, the multi-ribbon can include two or more initial ribbons inside the same common exterior sheath.

There is claimed:

1. An optical fiber multi-ribbon including at least two initial optical fiber ribbons having individual first sheaths for assembling the fibers of each ribbon together side by side and in a common plane and themselves disposed side by side and in a common plane and a common exterior second sheath surrounding said initial ribbons, wherein said individual first sheaths of said initial ribbons and said common exterior second sheath consist of the same resin.

2. The multi-ribbon claimed in claim 1 wherein said resin is a relatively hard resin.

3. The multi-ribbon as claimed in claim 1 including a transverse preferential rupture line passing through each point of contact between two consecutive initial ribbons.

4. An optical fiber multi-ribbon including at least two initial optical fiber ribbons having individual first sheaths for assembling the fibers of each ribbon together side by side and in a common plane and themselves disposed side by side and in a common plane and a common exterior second sheath surrounding said initial ribbons, wherein said individual first sheaths of said initial ribbons and said common exterior second sheath consist essentially of the same resin, whereby said common exterior second sheath adheres well to said individual first sheaths.

* * * * *